United States Patent

[11] 3,580,996

[72] Inventor Edward Stanton Maxey
921 E Ocean Blvd., Stuart, Fla. 33494
[21] Appl. No. 768,256
[22] Filed Oct. 17, 1968
[45] Patented May 25, 1971

[54] VIDEO LANDING AND DEPARTURE SYSTEM
20 Claims, 18 Drawing Figs.
[52] U.S. Cl. .................................................. 178/6.8,-
178/6DIG20, 343/6TV
[51] Int. Cl. ..................................................... H04n 7/18
[50] Field of Search ............................................ 178/6.8, 6
(Ind); 343/6 (TV); 35/10.2, 12 (A), 12 (L), 12 (N)

[56] References Cited
UNITED STATES PATENTS
| | | | |
|---|---|---|---|
| 2,298,476 | 10/1942 | Goldsmith ..................... | 178/6.8 |
| 2,959,779 | 11/1960 | Miller et al. ................... | 343/6 |
| 3,012,337 | 12/1961 | Spencer, Jr. et al. ......... | 35/12 |
| 3,205,303 | 9/1965 | Bradley ......................... | 178/6.8 |

Primary Examiner—Robert L. Griffin
Assistant Examiner—Richard K. Eckert, Jr.
Attorney—John Cyril Malloy ABSTRACT: A landing and departure system for aircraft, of particular utility in making blind landings at an airport. The system incorporates a closed circuit video system which provides a video display in an aircraft of a detailed model or mockup of the airport for use by the pilot in making the blind landing. In the system, the video camera and model mockup of the airport are moved relative to each other so that the line of sight view of the model airport, as seen by the camera, is the same as the line of sight view which would appear with clear visibility through the cockpit window to the eye of the pilot. The video camera is focused on the model and is movable along a track toward or away from the model in proportion to the approach or departure of the aircraft and simultaneously the model and camera are synchronously moved on tilt and rotating axes to provide a relationship between the camera and model airport in direct proportion to the position and altitude of the aircraft relative to the airport. Means are also provided to manipulate the camera in response to actual roll, pitch and yaw of the aircraft and to vary the video image accordingly. Appropriate ground and airborne electronic control means, such as radar, radio, continuous wave system, etc. are utilized to sense and move the elements of the system. Also, information, such as actual elevation, distance to the runway and other critical information may be transmitted to the aircraft and displayed on the marginal edges of the video picture.

Patented May 25, 1971

INVENTOR.
EDWARD STANTON MAXEY
BY John Cyril Malloy
ATTORNEY.

INVENTOR.
EDWARD STANTON MAXEY
BY John Cyril Malloy
ATTORNEY.

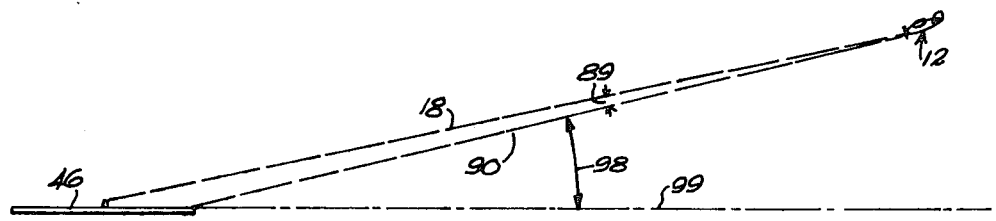
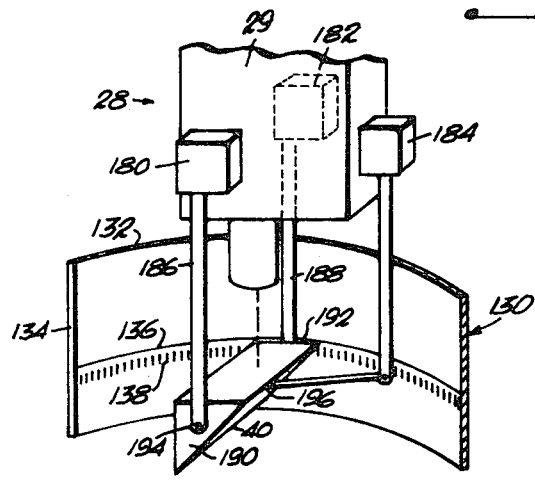
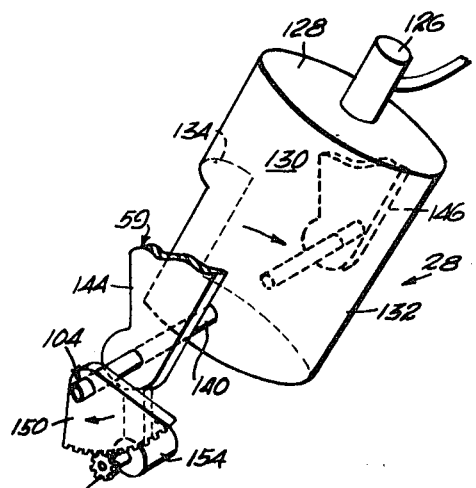
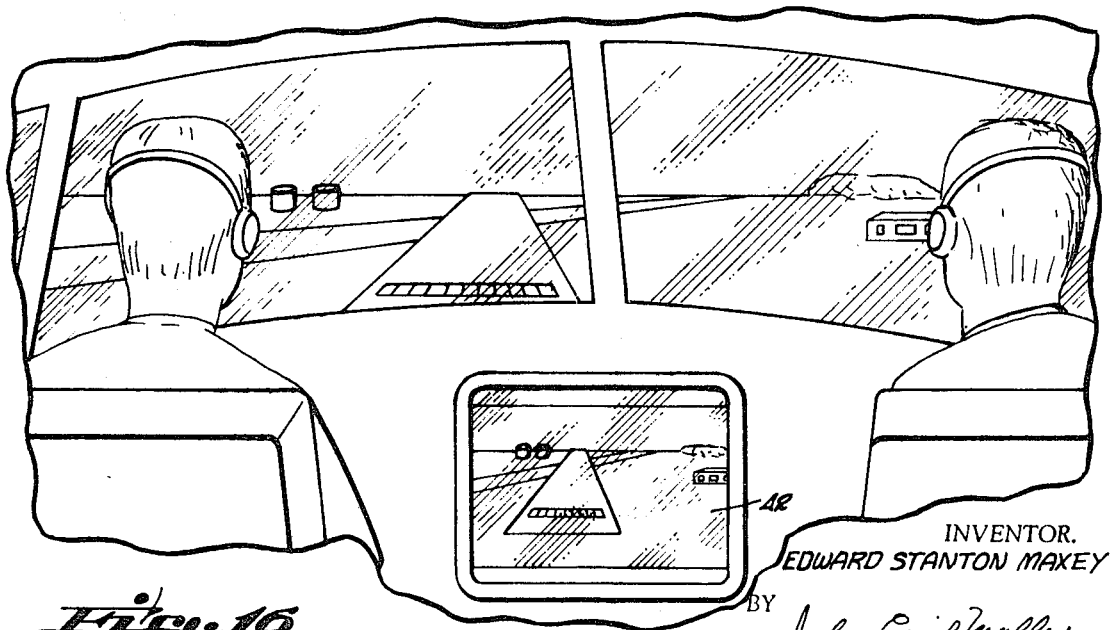
INVENTOR.
EDWARD STANTON MAXEY
BY
John Cyril Malloy
ATTORNEY.

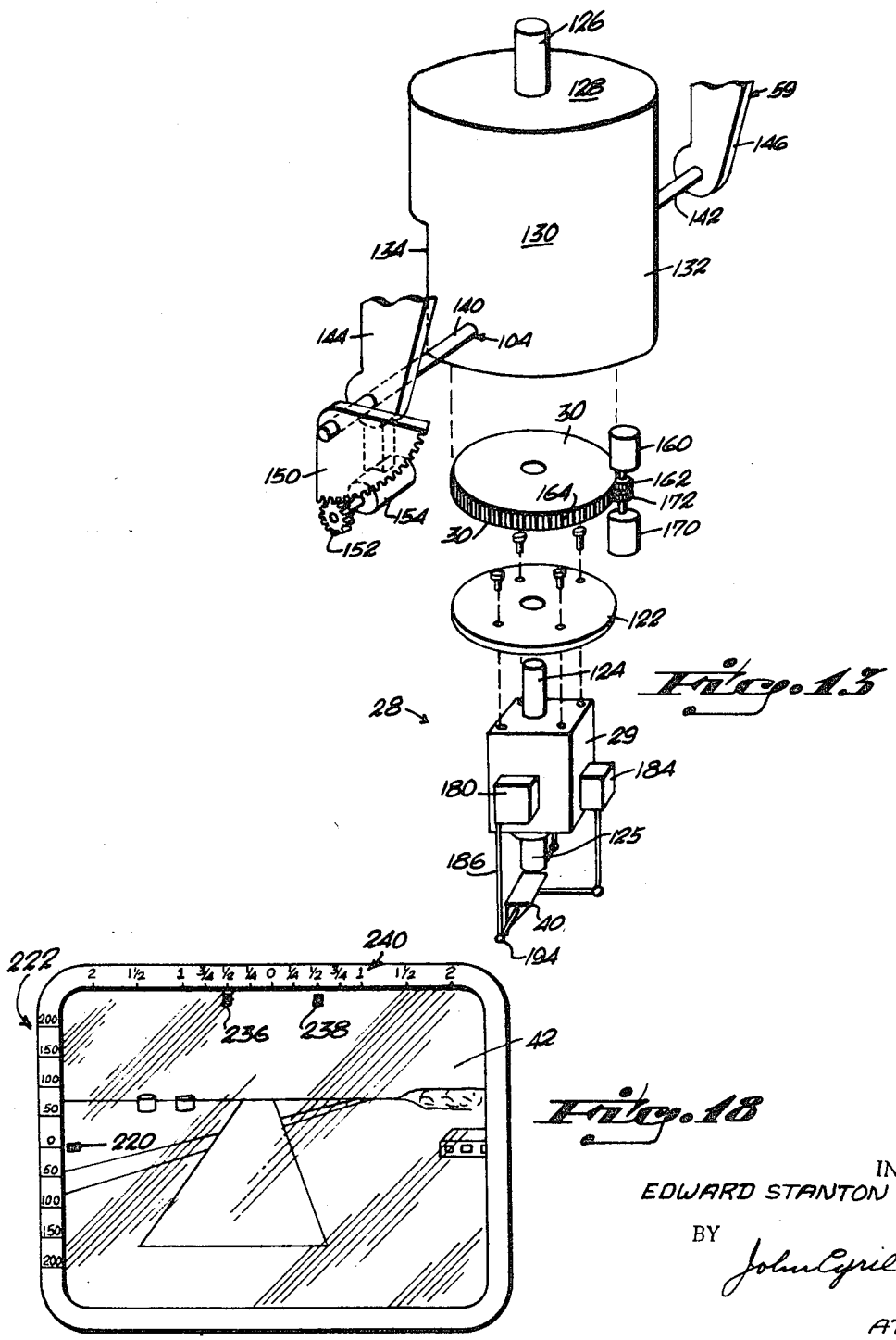

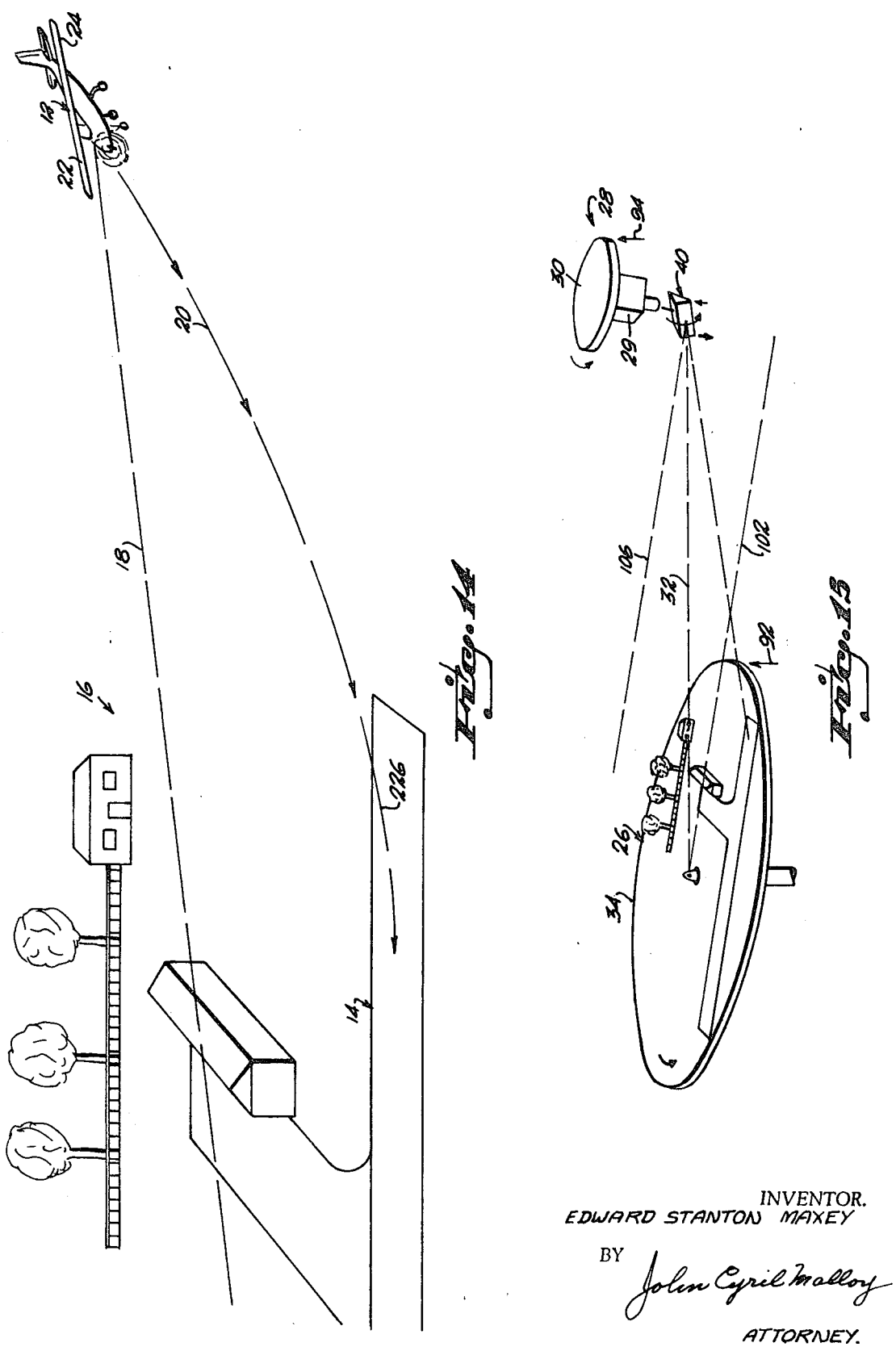

Patented May 25, 1971
3,580,996
6 Sheets-Sheet 6
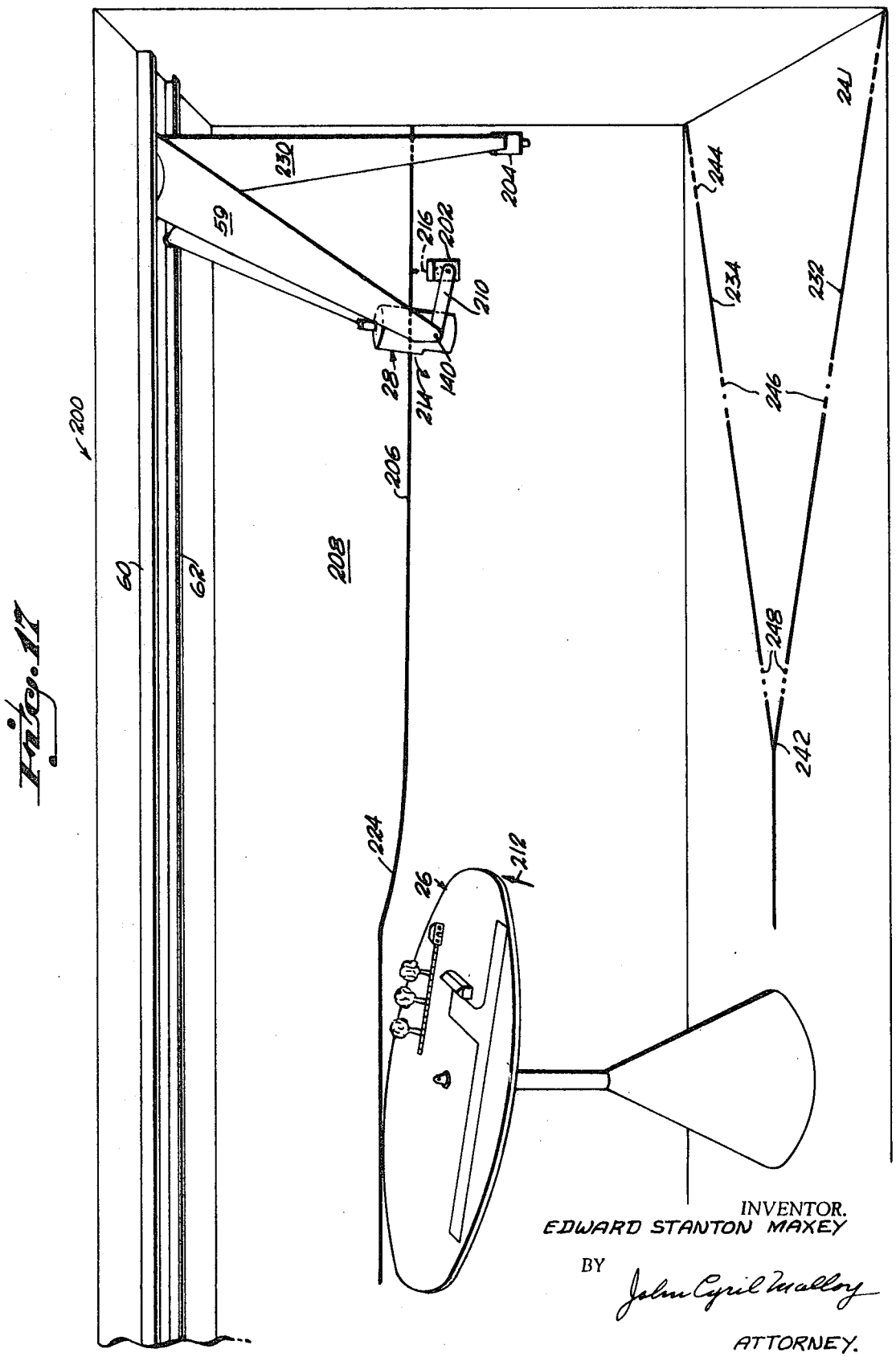
INVENTOR.
EDWARD STANTON MAXEY
BY John Cyril Malloy
ATTORNEY.

VIDEO LANDING AND DEPARTURE SYSTEM

This invention pertains to a video landing and departure system which has particular utility in completely blind landing of aircraft. It provides a continuously changing video display in the cockpit of the aircraft which simulates in every detail what the pilot would see under good visibility conditions. The display is of a scale mockup of the airport which is complete in every detail; and, of particular importance, continuously transmits a display to the aircraft which reflects the altitude, position and attitude of the aircraft relative to the airport at all times when the aircraft is within the airport control zone. Also, information such as actual altitude, distance to the runway, etc. may be integrated into the marginal edges of the video presentation.

In recent years, research and development has been conducted to improve flight simulators for training. Attempts to extend this technique to simulate the view of an airport as seen by an actual flying aircraft for reference by the pilot in low visibility weather has incurred various problems to provide suitable accurate orientation of a video camera over the terrain of a mockup model. A large expensive computer system has been required to accept radar and telemetry signals to determine the position and attitude of an aircraft and to send drive signals to the video camera system arranged over a stationary mockup model of an airport.

The system of the present invention does not use such a stationary mockup model, but, rather, a new technique of tilting and rotating both the mockup model table and the camera table synchronously, in addition to focusing the video camera through a prism which is revolved on both a horizontal and a lateral axis. With the various tilting and rotating movements of the tables and prism in addition to further revolving the camera in accordance with the heading of the aircraft, a truly accurate presentation of the mockup model relative to the position and attitude of the aircraft is transmitted to the pilot. All of the movements of the tables and prism are proportionately servomotor controlled by radar, radio, continuous wave systems or the like.

One of the principal objects of the instant invention is, therefore, to provide a video landing and departure system that permits the pilot of an aircraft to be in complete control of his craft at all times and to effect a safe landing or takeoff under extreme adverse visibility conditions by seeing a picture on a cockpit mounted video monitor that accurately presents the continuously changing relative position and attitude of his aircraft to the airport runway at all times when he is within the airport control area.

A further object of the invention is to provide radar and radio controlled servomotor means to move the video camera toward or away from the mockup model airport in direct proportion to the movement of an aircraft toward or away from an airport.

Yet another object is to provide further radar and radio servomotor control means for maintaining the relative position and attitude of the video camera to the mockup model airport at all times in complete accord with the relative position of an aircraft to the airport.

Another object of the instant invention is to integrate any critical information such as actual altitude and distance to the runway into the marginal edge or edges of the video presentation to give the pilot a continuous readout of his altitude and distance to the runway.

Still another object of this invention is to provide a system that allows "go arounds" in the event of missed approaches and which provides a horizon, direction and degrees marking presentation on the screen of the aircraft video receiver to assist the pilot in repositioning his aircraft for a new approach.

Another object of the invention is to provide a system that may be utilized in simulator trainers apart from the video approach mechanism.

Other objects and advantages of the present invention will be more fully apparent from the following detailed description of the instant invention when considered in conjunction with the accompanying drawings in which:

FIG. 10 is a schematic view in a vertical range of the approach of an aircraft to a runway as simulated in FIG. 9;

FIG. 11 is a fragmentary perspective view of the video camera assembly;

FIG. 12 is a perspective view of the video camera assembly;

FIG. 13 is an exploded perspective view of the camera assembly of FIG. 12;

FIG. 14 is a fragmentary perspective view of a typical airport with an aircraft making a conventional landing approach thereto;

FIG. 15 is a perspective view of a model airport simulating that of FIG. 14 and video camera assembly simulating the approach of the aircraft as seen in FIG. 14;

FIG. 16 is a perspective view of the cockpit of an aircraft illustrating the video presentation to the pilot, of the runway relative to the position and attitude of the aircraft as it would be in clear visibility;

Figure 1:
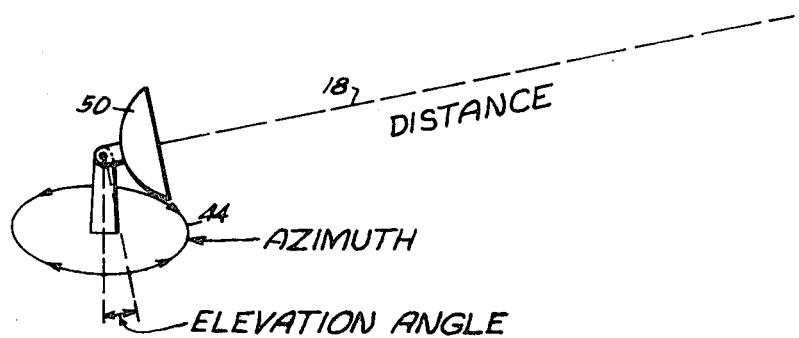
FIG. 1 is a schematic illustration of a typical radar antenna illustrating the derivation of the slant distance, azimuth and elevation angle of an aircraft.
Figure 2:
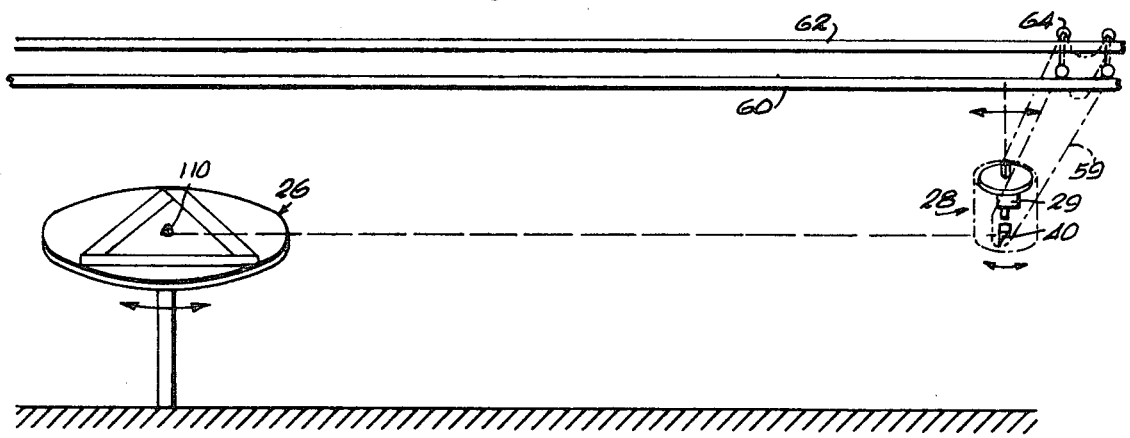
FIG. 2 is a schematic perspective of the model mockup of an airport and a video camera assembly movable relative thereto, in accordance with the present invention.

FIG. 17 is a schematic view of a model studio illustrating the present invention including two additional video cameras for transmitting the exact distance to the airport runway and the correct glide path respectively; and FIG. 18 illustrates a typical video receiver in an aircraft including the distance and guide path scales on the cathode ray tube mounting as well as the integration of dots in the top and one side marginal edge thereof as received from the two additional cameras.

Referring to the drawings in which like reference characters designate like or corresponding parts throughout the various views, and referring particularly to FIG. 14, the numeral 12 generally designates an aircraft approaching a runway 14 of an airport 16. The slant distance from a radar antenna, not shown in FIG. 14, but located at the airport, is designated by the numeral 18 and the theoretical glide path location of the aircraft is indicated by the arrowed line 20. It is to be noted that the aircraft, as depicted in FIG. 14, is approaching the runway from the right side as viewed by the pilot and will approach on the path indicated by the line 20 and that in such an approach the roll aspect of the attitude of the aircraft will be such that the right wing 22 is lower than the left wing 24, which is elevated or high.

An approaching aircraft has a line of sight relationship to the tracking radar antenna along the slant distance line 18 from the radar antenna to the aircraft. The antenna is slewed about the azimuth axis and is moved through an elevation angle to maintain this relationship. Distance is a function of radar analysis along line 18 of FIG. 14.

The present invention generally incorporates an accurately scaled, tiltable and rotatable mockup model 26 of the airport, as seen in FIG. 15, which is preferably complete in every detail including adjacent buildings, taxiways, etc. to better help in orientation, and a video camera assembly 28 mounted on a fixed track within a model studio along which the camera carrying table 30 may approach or move away from the model airport 26. The line of sight relationship between the antenna and the aircraft 12, as along line 18, is analogous to a line 32 in FIG. 15 which extends from the radar location on the tiltable mockup model to the camera lens. Both the airport and camera are mounted on synchronously rotating platforms 34 and 30 which in turn revolve synchronously with the slewing of the radar antenna in azimuth. Similarly, the elevation angle relationship is accomplished by tilting both the model airport and camera mounting platforms 34 and 30 synchronously along axes which are 90° from the line of sight 32.

With further reference to FIG. 15 and the model airport and camera assembly, the camera 29 is mounted on the table 30 with the centerline of the lens in coaxial relation with the axis of rotation of the table and of the camera assembly. A prism 40 is mounted beneath the video camera lens to normally focus the camera along the line 32. Also, as will be explained, this prism, in addition to being carried for movement of translation and rotation by the table, is pivotal on both a longitudinal and lateral axes which, as will be explained, is employed to simulate the roll and pitch of the aircraft.

At this point, it is well to point out that the movements just described in a general manner, i.e., the synchronous revolving and tilting of the model airport 26 and the camera carrying table 30, as well as the pivotal movement of the prism 40, provide an accurate small scale continuous relationship between the camera and model airport which simulates in all respects the same continuous relationship between the aircraft and airport. Referring to FIG. 16, the picture 42 as transmitted from the video camera to the video receiver in the aircraft will, therefore, be a mirror image of what the pilot would see in front of the aircraft with good visibility conditions.

It will be seen that the position of the camera 28 relative to the model airport 26 is determined by six factors: a primary set of three factors, the slant distance, elevation angle and azimuth angle of the aircraft, which are derived by the radar, and a secondary set of three factors, the roll, pitch and yaw of the aircraft, which are derived by radio from the aircraft.

For a more detailed description, first, of the means to synchronously revolve the model airport and camera assembly, reference is now made to the schematic illustrations of FIGS. 1 through 7. One of the functions of radar is to determine the position of an aircraft and to continuously track it by slewing on its azimuth as indicated at 44 in FIG. 1 and tilting the antenna.

Figure 3:
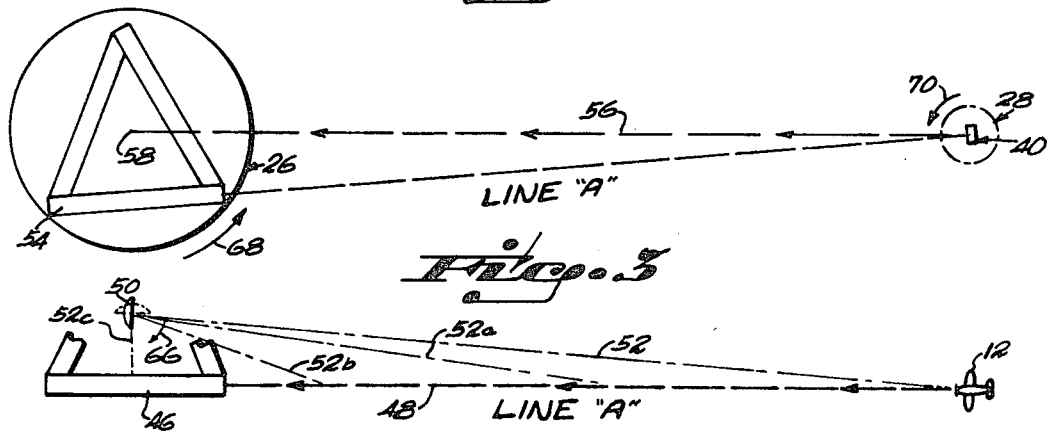
FIG. 3 is a schematic top plan view of FIG. 2.
Figure 4:
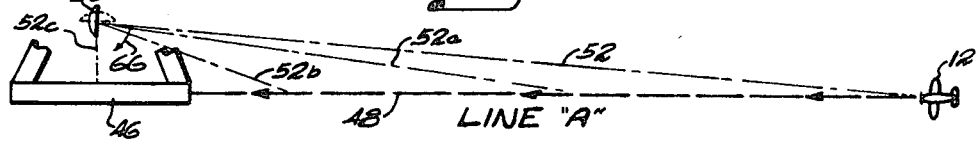
FIG. 4 is a schematic top plan or flat range illustration of an aircraft approaching a runway.

As to azimuth tracking, the slewing is illustrated in FIG. 4 wherein the aircraft 12 is approaching a runway 46 along a line 48. The radar antenna 50 is illustrated as tracking the aircraft along the line 52; and, as it approaches the runway 46, the antenna continues to be slewed clockwise on its azimuth axis as indicated by the line 52a, 52b and 52c. This condition is simulated by the scale model and camera assembly 26 and 28 of FIG. 3. The position of the aircraft 12 is simulated by the relative position of the prism 40 and the model airport 26. The prism 40 of the camera assembly 28 transmits or reflects the image of the airport model to the camera mounted thereabove. As the actual position of the aircraft relative to the actual airport is varied, the position of the prism 40 relative to the runway 54 of the model airport 26 is also varied continuously in the same manner, the tracking line 52 being simulated by the arrowed line 56 extending from the prism 40 to the point 58 at the top of the vertical axis of the model airport. It is important to note that the radar antenna is located on the airport in the same relative central position as the point 58 in FIG. 3 is to the model airport 26. The camera assembly 28 is moved horizontally towards the model airport in the vertical plane which includes both the vertical axes of the model airport and the camera assembly. As indicated by the dotted lines in FIG. 2, the camera assembly is in a carriage 59 suspended from a pair of ceiling mounted tracks 60 and 62 on trolley rollers 64.

As the aircraft 12 of FIG. 4 approaches the runway 46, the carriage 59 moves the camera assembly 28 toward the airport model by means of conventional servomotors which respond in direct proportion to the approach of the aircraft to the runway 46. This is accomplished by radar information derived from the slant distance to the aircraft as illustrated by the line 48. Additionally, both 1) the airport model 26 and 2) the camera carrying table 30 are synchronously rotated by radar derived azimuth information which directs servomotors to rotate both in amounts equal to azimuth changes but in directions opposite those registered. This is illustrated in FIGS. 3 and 4. The radar antenna 50 is rotating clockwise on its azimuth in FIG. 4 as it tracks the approach of the aircraft 12, as indicated by the arrow 66; and, as seen in FIG. 3, both 1) the model airport 26 and 2) the camera assembly 28 are synchronously rotating counterclockwise as indicated by the arrows 68 and 70.

Figure 5:
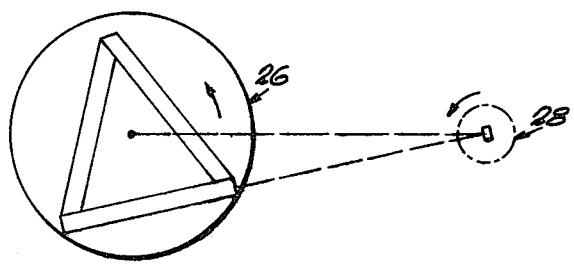
FIG. 5 is a schematic view similar to FIG. 3 illustrating the changing relationship between the model airport and video camera assembly simulating the closer approach of an aircraft to the runway.

With reference now to FIG. 5, the camera assembly 28 has approached the model airport 26 by the servomotors to simulate the close approach of the actual aircraft 12 to the actual runway 46. It is seen in this relative position that both 1) the model 26 and 2) the camera assembly 28 have to be simultaneously rotated counterclockwise to accurately portray the position relationship therebetween which simulates that which exists between the actual aircraft and the runway. For example, if the radar antenna is slewed on its azimuth through an arc of 10° clockwise, the model and camera assembly 26 and 28 each rotate synchronously counterclockwise through mirror image arcs of 10° to show this relationship.

Figure 6:
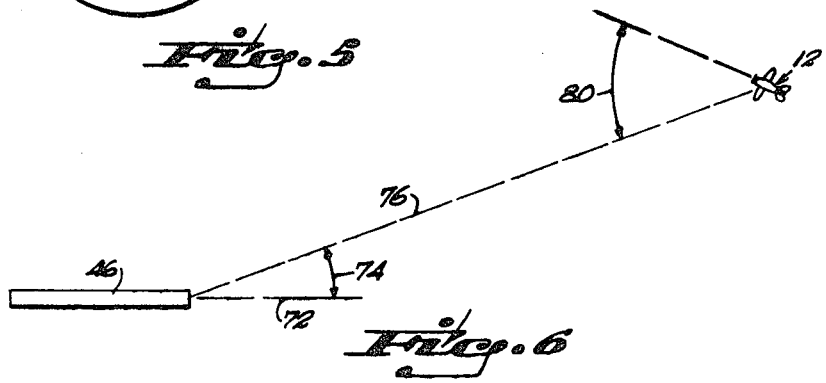
FIG. 6 is a schematic view similar to FIG. 4 and illustrating a different relationship between the aircraft and the runway.
Figure 7:
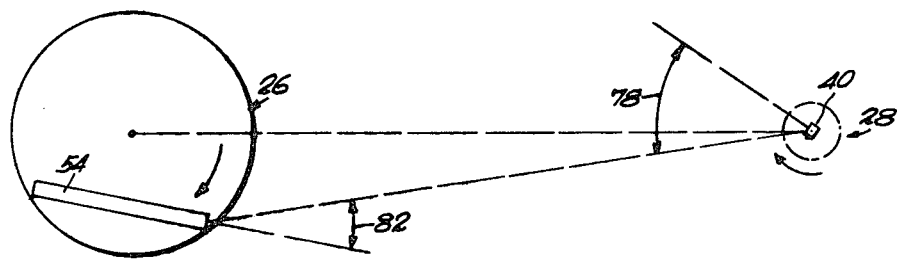
FIG. 7 is a schematic view similar to FIG. 3 in which the model airport and video camera assembly simulate the relationship between the aircraft and the runway as seen in FIG. 6.

Referring to FIG. 6, the aircraft 12 is illustrated in a flat range position away from a linear projection 72 of the runway a number of degrees as determined by the angle 74 between said projection 72 and a line 76 from the end of the runway to the aircraft. As shown in FIG. 7, this position of the actual aircraft 12 relative to the airport 26 is proportionately simulated by the position of the camera assembly 28 relative to the model 26 through the use of the radar azimuth and slant distance information in the manner just described. However, as the aircraft is on a course which is angled away from the runway, the camera assembly is further rotated on its vertical axis by means of radio derived yaw information from the aircraft in a manner to be described later in the specification. This yaw information further rotates the camera assembly on its vertical axis through a compensating arc 78 equal in degrees to the aircraft yaw as defined by the arc 80. Therefore, as seen in FIG. 7, the position and attitude of the aircraft 12 in FIG. 6 relative to the runway 46 is simulated in scale by the camera assembly 28 relative to the model 26, the yaw angles 78 and 80 being equal and the position angle 74 being equal to the angle 82.

Figure 8:
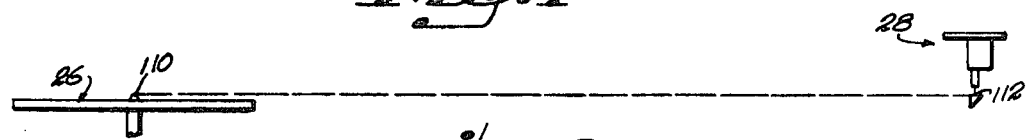
FIG. 8 is a side elevational view of FIG. 3.
Figure 9:
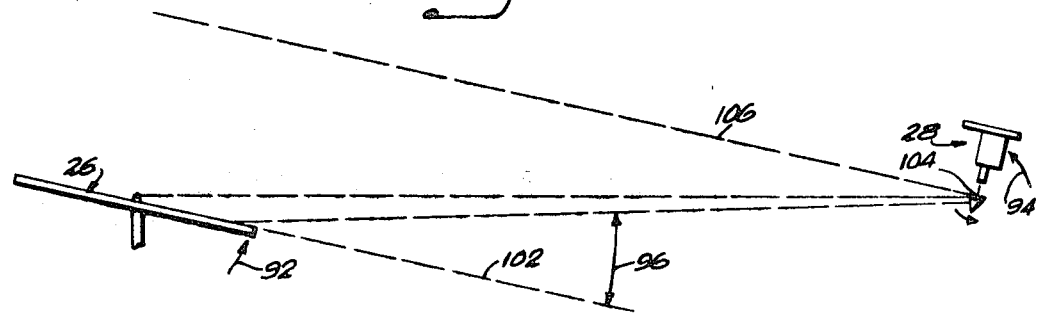
FIG. 9 is a view similar to FIG. 8 schematically simulating in a vertical range the approach of an aircraft.

FIGS. 8, 9 and 10 illustrate tilting of the antenna through the elevation angles. The operation of the airport model 26 and camera assembly 28 in a vertical range is seen in FIGS. 8 and 9. In FIG. 10, the approach of the aircraft 12 to the runway 46 is illustrated. As previously described, the line of sight or slant distance line 18, FIG. 10, extends from the radar antenna to the aircraft; however, the included angle 89 between the pitch line 90 of the aircraft, which corresponds in the vertical range to the approach line 20 in the flat range, and the slant distance line 18 as the aircraft is making its approach varies continuously. This occurs because the radar antenna swings on its elevation angle axis to track the descent of the aircraft along its glide path. Radar derived elevation angle information is utilized and servomotors tilt both 1) the airport model 26 and 2) the camera assembly 28 synchronously in a common direction of rotation through a number of degrees equal to, but in an opposite direction of rotation, to those registered by the radar unit, as indicated in the drawings by the arrows 92 and 94, indicating the compensating mirror image angles; see FIG. 15.

Variations in pitch of the aircraft are compensated for by rotating the prism 40 independently of the camera on its lateral axis in response to pitch data via a radio driven servomotor as will be described subsequently in more detail. As illustrated in FIG. 9, the prism is rotated to simulate the pitch of the aircraft; and the angle 96 is equal to the pitch angle 98 of the aircraft in FIG. 10.

The altitude of the aircraft in FIG. 10 is the vertical distance from the ground line 99 to the aircraft, and this altitude is simulated in scale in FIGS. 9 and 15 by the vertical distance between the model airport ground line 102 and the lateral tilt axis 104 of the camera assembly or to the projected line 106 parallel to the ground line.

It is, therefore, apparent that the various radar and radio servomotor controlled movements of the model airport 26 and camera assembly 28 in the flat and vertical ranges as just described, along with a radio servomotor controlled roll deviation to be described, continuously position the model, camera assembly and prism to present a continuously changing video display to the pilot of the aircraft which accurately portrays the view to be seen from the position and attitude of the aircraft relative to the airport.

To compensate for the height of the antenna above the ground level of the airport, as illustrated in FIG. 6, the tilt axes 110 and 112 of the model table and camera assembly; see FIG. 8 respectively, are positioned slightly above the table and prism centers, the actual distance being dependent upon the height and the scale of the system. It is also apparent that the system is equally operable if the camera assembly carriage is mounted in a fixed position and the model airport table is mounted on a movable carriage for translation toward and away from the camera assembly. This completes the description of the main portion of the operation and the structure will now be described.

With reference to FIGS. 11, 12 and 13, the camera assembly 28 comprises the video camera 29 fixed to a mounting bracket 122 which is carried by the table 30. Referring to the exploded view of FIG. 13, the camera includes a male stud member 124 fixed to its upper end in axial alignment with the lens barrel 125. The stud is rotatably received and carried in a female member 126 fixed to the upper surface 128 of a cylindrical housing 130. Cooperating slipring assemblies, not shown, are carried on the male stud 124 and within the female member 126 to carry electric currents. The cylindrical wall 132 of the housing 130 extends downwardly to surround the camera and associated prism 40 with the exception of a cutout opening 134 sized and positioned with respect to the prism to permit desirable viewing angles toward the model airport in both horizontal and vertical directions. It is desirable that the sides of the cutout opening 134 provide a horizontal viewing angle for the camera of between 30 and 40 degrees. The inside surface of the wall 132 is provided with a calibrated horizon line 136, FIG. 11, which extends around the remaining 320 or 340° of the interior of the housing, with the appropriate direction and degree markings 138 being provided. The horizon line and degree markings are provided to inform a pilot of the orientation of his aircraft relative to the airport even when his direction of flight or position rotates the camera assembly beyond the 30 to 40° horizontal opening 134 and the model airport is not visible to the camera.

With further reference to FIGS. 12 and 13, the camera assembly pivot 104 comprises a pair of pivot rods 140 and 142 extending outwardly from the housing in a diametrically opposed relationship to be pivotally engaged by downwardly extending arms 144 and 146 of the carriage 59 which, as previously described, is driven by servomotors toward or away from the airport model in accordance with the radar derived slant distance. A gear segment 150 fixed to one pivot rod such as 140 is driven by a pinion gear 152 which is in turn driven by a servomotor 154. Servomotor 154 is directed by the radar derived elevation angle to tilt the entire camera assembly 28 and housing 130 the same number of degrees as said elevation angle, but, as described above, in the opposite direction. A similar servomotor, not shown, synchronously tilts the model airport table 26 in a similar manner to provide the proper relationship between the camera and model as exists between the aircraft and the airport in the vertical range as previously described in detail.

A servomotor 160, FIG. 13, which is fixed inside the housing 130 rotates the camera table 30 on its vertical axis relative to the housing 130 by means of a pinion gear 162 which is in driving engagement with the upper portion of gear teeth 164 about the outer edge of the camera carrying table 30. This servomotor 160 is directed by radar derived azimuth information. A similar servomotor, not shown, synchronously performs the same function on the airport model table 26. In this manner, as previously described, the two tables 26 and 30 are synchronously revolved with the slewing of the radar antenna on its azimuth but in the opposite direction thereto. Therefore, the proper relationship between camera and model, and aircraft and airport is maintained in a flat range.

Another servomotor 170 provided with a pinion gear 172 in mesh with the lower portion of the table gear teeth 164, further rotates the camera table 30 on its vertical axis by means of radio derived yaw information, the camera 120 thereby being aimed in the direction of flight of the aircraft and in combination with servomotor 160 establishes both the position and direction of flight of the camera relative to the model as exists between the aircraft and airport.

Referring to FIGS. 11 and 13, pitch and roll data is accommodated by means of three radio driven servomotors 180, 182 and 184; the two servomotors 180 and 182 are mounted on opposed sides of the camera and are operably linked as at 186 and 188 to the centers of the opposed side faces 190 and 192 of the prism as at 194. These two servomotors are driven by the aircraft radio in unison and in opposite directions to tilt the prism about a longitudinal axis 196 to simulate the roll of the aircraft. The servomotor 184 is likewise driven by the aircraft radio to rotate said prism on its lateral axis, through the pivot points 194, to simulate the pitch of the aircraft.

The model airport table 26, the camera assembly 28 and prism 40 are, therefore, being continuously positioned relative to each other to exactly simulate the relative position of the aircraft to the airport by means of slant distance, elevation angle, and azimuth derived from radar and the yaw, pitch, and roll of the aircraft derived from the aircraft radio. As the model airport as well as the distance maintained between the model and camera are precisely to scale, the exact proportional three-dimensional track of an approaching aircraft is simulated between the model and camera, and the video picture transmitted to the aircraft, FIG. 16, is a true representation of the relative position of the aircraft to the airport.

It is apparent that the camera described above will see only a segment of air space comparable and proportional to the airport control zone. To supplement the video display, actual elevation and distance from the touchdown point of the airport runway may be provided, since this information is a mechanical readout which may be photographed by a separate video camera and integrated into the corners or marginal edges of the video presentation. Additional critical information may also be fed into the corners or marginal edges in the same manner.

Information acquisition of ground based equipment in addition to the precision approach radar presently in use may include the radio triangulation system which incorporates two ground based radio direction finders to determine location or with a third direction finder from which altitude may be determined. A continuous wave system with the use of an aircraft borne transponder may also be employed. Information from electronic pickups in an aircraft gyrocompass and gyrohorizon may be transmitted via transponder modulation or by assigned radio frequency carrier to aim the camera along the axes of the three-dimensional path of the aircraft.

The camera "flies" the same proportional track as the approaching aircraft and after landing "taxis" the same route. Referring once more to FIG. 4, it is readily apparent that the radar antenna will continue to track the aircraft as it proceeds along the runway after landing. The model and camera tables 26 and 28 in FIG. 3 continue to revolve synchronously therewith permitting the pilot to have a video presentation of the runway as it actually appears throughout its length. The system of the present invention is, therefore, equally applicable to takeoffs or landings, as well as touch-and-go practice landings. In the event of missed approaches, the system allows "go around" and continues to function in the same manner through 360° revolution. In a "go around," when the yaw of the aircraft takes it out of the 30 to 40° seen by the camera, the degree markings 138 in the housing 130 assist the pilot in repositioning the aircraft for another approach.

With reference to FIG. 17, the numeral 200 generally indicates a model studio in accordance with the present invention and includes the mockup airport model and camera assembly 26 and 28 respectively which function in the manner described. Two additional video cameras 202 and 204 are suspended from the tracks 60 and 62 on the carriage 59, the first of said cameras 202 is focused generally transversely toward an established and preferred glide path line 206 accurately scribed on the studio wall 208 in any suitable manner. Camera 202 is suspended on a lever arm 210 off of the tilt axis rod 140 of the camera assembly 28 and is preferably mounted in any convenient manner to be maintained in an upright position at all times as the arm 210 is tilted with the camera assembly 28.

As previously described, the model table and camera assembly 26 and 28 synchronously tilt in amounts equal to but in directions opposite to the swing of the radar antenna in tracking an aircraft in its horizontal axis. Consequently, as an aircraft is descending on its glide path in a landing approach, the model table and camera assembly 26 and 28 are tilting counterclockwise as at 212 and 214 and the camera 202 as stated is focused on the guide path line 206 as at 216, it being noted at this point that FIG. 17 is in perspective. By using conventional video techniques, this line 206 is integrated in one vertical side edge of the video picture, FIG. 18, appearing as a dot 220, and as viewed in conjunction with the scale 222, indicates, by variations from the zero point, if the pilot is on the correct glide path or exactly how far above or below it he may be. The line 206 is carefully scribed on the wall 208 and includes a "flare-out" position 224, FIG. 17, corresponding to the flare-out position 226, FIG. 14, leading to runway contact of the aircraft wheels.

In a somewhat similar manner, the downwardly aimed video camera 204, equipped with a wide angle lens and fixed to carriage 59 by means of an arm 230, is focused on the floor and scans a pair of converging lines 232 and 234 scribed thereon. These lines appear as dots 236 and 238, FIG. 18, on the top marginal edge of the video tube in the cockpit and provide data as to the distance to the runway by means of scale 240. The dots become one when the camera 204 reaches the point of convergence 242, indicating that the aircraft is over the runway, and when this occurs simultaneously with the dot 220 reaching the zero position on scale 222, the aircraft will have touched down on the runway.

Additionally, the converging lines 232 and 234 may each include appropriate breaks as indicated at 244, 246 and 248 which are positioned to scale with the conventional outer, middle and inner marker light locations on the approach pattern to a runway. The breaks in the converging lines may be such that they flash on and off of the video tube as series of dashes, dot dashes, and dots in accordance with the lights of the three marker positions.

Landings may be video taped for criticism, examination or for teaching purposes.

At this point it may be helpful to appreciate that by this structure and teaching it is possible to simulate the picture of an airport as seen from a flying aircraft by relative movement of the lens relative to the airport model but with a small amount of actual movement of the prism relative to the airport mockup or model. In fact, the three-dimensional movement of the aircraft is simulated with only reciprocal movement of translation being possible in one direction by the prism; that is, the prism is only permitted to be moved toward or away from the model. The other 2° of freedom or directions of movement of translation of the aircraft, i.e., vertically and laterally with respect to the longitudinal axis of the runway, are compensated for by this structure by the simultaneous synchronous rotation of both the airport, not the runway, about its center, which is in the same relative location as the radar antenna, which is at the middle of the airport, it being apparent that the tilting of the table on which the airport model is located simultaneously and synchronously with the camera prism in an opposite direction compensates for the variations in the view of the airport as seen by the actual aircraft by reason of variations of change in altitude. By reason of the compensating synchronous simultaneous opposite rotation of the model and the lens, the advantages of the simulated mockup for poor visibility landings are made possible in an inexpensive installation which does not require a large model and a camera which is moved relative to the model in three directions of rotation, vertically, horizontally and laterally.

I claim:

1. A video landing and departure system for aircraft for installation at an airport for use by an aircraft provided with a video receiver installed in the cockpit comprising:

A. a mockup scale model of said airport comprising a table which is rotatable on a vertical axis and tiltable on a horizontal axis;

B. a closed loop video system including:

1. a first video camera which is rotatable on the vertical axis of the camera lens and tiltable on a horizontal axis parallel to said tilt axis of the airport model, and means to direct the viewing range of said camera toward said mockup model airport; and 2. means to transmit the video camera image to the receiver for causing a video display of said model for viewing by the pilot;

C. ground based electronic means to derive the slant distance, azimuth and elevation angle of said aircraft and control means, operable by said ground based electronic means to vary the distance between said model airport and first video camera and to synchronously rotate and tilt both a) said model and b) said video camera on said vertical and horizontal axes respectively, means to synchronize inverse relative angular movement in azimuth, slant distance and elevation angle of said mockup scale model of said airport table and said first video camera to continuously maintain and display the same slant distance, azimuth and elevation angle relationship between said model and video camera as that existing between said aircraft and airport;

D. means operable by electronic transmissions from said aircraft of data as to yaw of said aircraft to vary the position of said video camera and said means to direct to respond to said data to continuously vary the relationship between said model and video camera to maintain that relation which exists between said aircraft and the airport.

2. The device as set forth in claim 1 wherein said means to direct comprises a glass prism configured and positioned intermediate the lens of said first camera and said mockup scale model of said airport, said prism including means for orienting and mounting the same for relative movement with respect to said lens in relation to said pitch and roll data.

3. The device as set forth in claim 1 wherein said means operable by electronic transmissions from said aircraft of data as to pitch and yaw of said aircraft is also operable in response to data as to roll of said aircraft and said device includes means to control and position said video camera and means to respond to said data as to roll to continuously vary the relationship between the model and the video camera as that relationship varies between said aircraft and the airport.

4. A video landing and departure system for aircraft as set forth in claim 3 wherein said control means to vary the distance between said model airport and video camera and to synchronously rotate and tilt said model and first video camera on their respective vertical and horizontal axes comprises radar controlled servomotors.

5. A video landing and departure system for aircraft as set forth in claim 4 in which said servomotors which synchronously rotate and tilt said model and first video camera are synchronously operated by the slewing of the radar antenna on its azimuth and movement on its elevation angle respectively, said rotation and tilting of said model and first video camera being in direct proportion to but in opposite directions to the movements of the radar antenna.

6. A video landing and departure system for aircraft as set forth in claim 4 in which said control means for positioning said first camera to accommodate the yaw of said aircraft comprises a radio controlled servomotor which rotates said first video camera on its vertical axis to focus said first camera relative to said model airport in accord with the bearing of said aircraft relative to said airport.

7. A video landing and departure system for aircraft as set forth in claim 6 in which said control means to position said prism to accommodate said roll and pitch data comprises a pair of cooperating radio controlled servomotors to tilt said prism on its longitudinal axis to accommodate the roll of the aircraft and a radio controlled servomotor to tilt said prism on its lateral axis to accommodate the pitch of the aircraft.

8. A video landing and departure system for aircraft as set forth in claim 7 including a carriage for said camera, prism and associated servomotors, said carriage being suspended from ceiling mounted track means for said radar controlled servomotor movement toward or away from said model.

9. A video landing and departure system for aircraft as set forth in claim 8 including a cylindrical housing surrounding said first camera, prism and associated servomotors, said housing being provided with an appropriate cutout portion sized and positioned to permit desirable viewing angles toward the model airport in both horizontal and vertical directions.

10. A video landing and departure system for aircraft as set forth in claim 9 including a male stud member extending vertically upwardly from said first camera and a cooperating female member extending upwardly from the cylindrical housing for reception of said male stud member to rotatably suspend said camera therefrom.

11. A video landing and departure system for aircraft as set forth in claim 10 including cooperating slipring assemblies on the male stud member and within the female member to carry electric circuits.

12. A video landing and departure system for aircraft as set forth in claim 9 including a pair of horizontal diametrically opposed, outwardly extending pivot rods on said housing for engagement in downwardly extending arms of said camera carriage to accommodate said tilting of said first camera on said horizontal axis.

13. A video landing and departure system for aircraft for installation at an airport for use by an aircraft provided with a video receiver installed in the cockpit comprising:
  A. a mockup scale model of said airport comprising a table which is rotatable on a vertical axis and tiltable on a horizontal axis;
  B. a closed loop video system including:
    1. a first video camera which is rotatable on the vertical axis of the camera lens by a combination of synchronous rotation with the airport model plus yaw rotation telemetered from the aircraft and tiltable on a horizontal axis parallel to said tilt axis of the airport model, and means to direct the viewing range of said camera toward said mockup model airport; and
    2. means to transmit the video camera image to the receiver for causing a video display of said model for viewing by the pilot;
  C. ground based electronic means to derive the slant distance, azimuth and elevation angle of said aircraft and control means, operable by said ground based electronic means to vary the distance between said model airport and first video camera and to synchronously rotate and tilt both a) said model and b) said video camera on said vertical and horizontal axes respectively, in a manner to continuously maintain and display the same slant distance, azimuth and elevation angle relationship between said model and video camera as that existing between said aircraft and airport;
  D. control means operable by electronic transmissions from said aircraft of data as to roll, pitch and yaw of said aircraft to vary the position of said video camera and said means to direct to respond to said data to continuously vary the relationship between said video camera and model to reflect that relation which exists between said aircraft and the airport, said control means for positioning said first camera to accommodate the yaw of said aircraft comprising a radio controlled servomotor which rotates said first video camera on its vertical axis to direct said first camera relative to said model airport in accord with the yaw of said aircraft, said control means to position said prism to accommodate said roll and pitch data comprising a pair of cooperating radio controlled servomotors to tilt said prism on its longitudinal axis to accommodate the roll of the aircraft and a radio controlled servomotor to tilt said prism on its lateral axis to accommodate the pitch of the aircraft; and
  E. a carriage for said camera, prism and associated servomotors, to synchronize relative changes and distance between the camera and airport model by radar derived slant range data, said carriage being movably mounted for movement toward or away from said model, and including a cylindrical housing surrounding said first camera, prism and associated servomotors, said housing being provided with an appropriate cutout portion sized and positioned to permit desirable viewing angles toward the model airport in both horizontal and vertical directions, said cutout portion providing a horizontal viewing angle in order of 30 to 40° and a horizon line extending around the remaining 320 to 330° of the interior of said housing to be viewed by said first video camera when the yaw of said aircraft rotates said first video camera out of the 30 to 40° range of the cutout portion.

14. A video landing and departure system for aircraft as set forth in claim 21 including direction and degree markings about the interior of said housing adjacent said horizon line to be viewed by said first video camera simultaneously therewith.

15. A video landing and departure system for aircraft as set forth in claim 3 including the integration in the marginal edges of the video presentation to the pilot of actual altitude, distance to the runway and any other pertinent vital information acquired by conventional ground based equipment and photographed by a separate video camera.

16. A video landing and departure system for aircraft as set forth in claim 14 including a second video camera suspended from said carriage and a vertical wall adjacent said model and first video camera including a line representing the correct glide path and flare out of an aircraft making a landing approach to an airport, said second video camera being positioned relative to said line and being tiltable and movable longitudinally with said first video camera to transmit to said airborne video receiver in said aircraft a presentation to the pilot thereof the relationship of the glide path of said aircraft relative to the correct guide path as indicated by said line.

17. A video landing and departure system for aircraft as set forth in claim 16 in which said presentation of the relationship between the glide path of said aircraft and said line comprises a scale on one vertical side of the frame of the cathode ray tube of said receiver and a dot transmitted by said second camera integrated in the corresponding side edge of the video presentation, said scale including a marking indicating the aircraft is on the correct glide path when said dot is in alignment therewith and gradations above and below said marking to indicate respectively the distance of the aircraft above or below the correct glide path as determined by the position of said dot relative to said gradations.

18. A video landing and departure system for aircraft as set forth in claim 17 including a third video camera suspended from said carriage and a pair of lines on the floor converging toward said model airport, said third video camera including a wide angle lens focused on said converging lines and being movable toward said model airport with said first and second video cameras to transmit to said airborne video receiver in said aircraft a presentation to the pilot thereof the exact distance of the aircraft to the end of said airport runway.

19. A video landing and departure system for aircraft as set forth in claim 18 in which said distance presentation to the pilot comprises a scale on one horizontal side of the frame of the cathode ray tube of said receiver and a pair of dots integrated in the corresponding longitudinal side edge of the video presentation, said scale including a central marking indicating the point of convergence of said lines which represents the position of the aircraft over the end of the runway, and markings to each side of said central marking indicating distances to said runway, said pair of dots being spaced relative to the spacing between said converging lines indicating to the pilot by means of said horizontal scale the exact distance to the end of said runway and then merging into one dot at said point of convergence when the aircraft arrives at a position over the end of the runway.

20. A video landing and departure system for aircraft as set forth in claim 1 in which said first video camera is located in a fixed position and said scale mockup airport is movable toward or away from said first camera.